(12) United States Patent
Durif

(10) Patent No.: US 7,819,154 B2
(45) Date of Patent: Oct. 26, 2010

(54) SEGMENTED LOCKING RING IN AN ASSEMBLY FOR MOUNTING A TIRE ON A RIM

(75) Inventor: Pierre Durif, Enval (FR)

(73) Assignee: Michelin Recherche et Technique S.A., Granges-Paccot (CH)

(*) Notice: Subject to any disclaimer, the term of this patent is extended or adjusted under 35 U.S.C. 154(b) by 179 days.

(21) Appl. No.: 11/887,814

(22) PCT Filed: Mar. 27, 2006

(86) PCT No.: PCT/EP2006/061056
§ 371 (c)(1), (2), (4) Date: Oct. 3, 2007

(87) PCT Pub. No.: WO2006/106051
PCT Pub. Date: Oct. 12, 2006

(65) Prior Publication Data
US 2009/0039697 A1    Feb. 12, 2009

(30) Foreign Application Priority Data
Apr. 5, 2005    (FR) .................................. 05 03394

(51) Int. Cl.
*B60B 25/14* (2006.01)

(52) U.S. Cl. ...................................... 152/409; 152/410

(58) Field of Classification Search ......... 152/402–410, 152/DIG. 20; 301/37.32, 37.33
See application file for complete search history.

(56) References Cited

U.S. PATENT DOCUMENTS

| | | | | |
|---|---|---|---|---|
| 2,736,610 | A * | 2/1956 | Waite | 301/37.42 |
| 3,623,530 | A * | 11/1971 | Beyers et al. | 152/410 |
| 4,995,673 | A * | 2/1991 | DuBost | 301/37.36 |
| 5,603,553 | A * | 2/1997 | Klieber et al. | 301/37.41 |
| 6,631,747 | B2 * | 10/2003 | Durif | 152/409 |
| 6,786,259 | B2 * | 9/2004 | Vehar et al. | 152/410 |
| 7,040,642 | B2 * | 5/2006 | Lowry | 280/304.1 |
| 2005/0109783 | A1 * | 5/2005 | Smith | 220/319 |

FOREIGN PATENT DOCUMENTS

| | | |
|---|---|---|
| FR | 2 087 770 | 12/1971 |
| WO | WO 00/71365 | 11/2000 |
| WO | WO 03/064183 | 8/2003 |

* cited by examiner

*Primary Examiner*—Russell D Stormer
(74) *Attorney, Agent, or Firm*—Cohen Pontani Lieberman & Pavane LLP (57) ABSTRACT

A locking ring for a ring for mounting on a hub of a vehicle, the mounting ring being intended to receive a bead of a tire in an assembly for mounting the tire on the hub of a vehicle. The locking ring comprises a polymeric envelope and an incompressible reinforcing element, the two elements being separable.

9 Claims, 6 Drawing Sheets

SEGMENTED LOCKING RING IN AN ASSEMBLY FOR MOUNTING A TIRE ON A RIM

RELATED APPLICATION

This is a U.S. National Stage of International Application No. PCT/FR2006/061056 filed on Mar. 27, 2006.

This patent application claims the priority of French patent application no. 05/03394 filed Apr. 5, 2005, the disclosure content of which is hereby incorporated by reference.

FIELD OF THE INVENTION

The invention relates to an element of an assembly for mounting a tire on a hub of a vehicle. More specifically, the invention relates to a locking ring for a ring for mounting on a hub of a vehicle, the mounting ring being intended to receive a bead of a tire, particularly of the "tubeless" type, that is to say a tire that has no separate air chamber.

A mounting assembly such as this is more particularly intended to be fitted to heavy vehicles of the earth-moving and construction vehicle type for example, such as those used in mines.

BACKGROUND OF THE INVENTION

The customary embodiments of running gear are of two types as far as the wheel rims are concerned. They are produced either with what are known as drop-center rims, which have tapered bead seats inclined by an angle of 5° or 15° with respect to the axis of rotation of the assembly, or with flat or practically flat base rims which have bead seats inclined either by 0° or by 5° with respect to the axis of rotation.

Drop-center rims have a mounting groove the diameter of which is markedly smaller than the nominal diameter of the rim. This internal diameter of the rim is considered by users to be too small because it does not, for example, allow brake drums to be selected that are of a size suited to effective braking of vehicles which are becoming increasingly powerful with respect to their weight.

As a result, the rims are commonly used for mounting and running, for example, tires of passenger vehicles and/or heavy goods vehicles, but are used far less, if at all, for other types of vehicles such as, for example, earth-moving and construction equipment.

In order to fit tires, particularly tires of the tubeless type, a flat base rim requires there to be at least one removable lateral ring, a locking ring and a seal, and obviously the base of the rim to have a fixed flange on the opposite side to the side on which the parts are removable. This is because the dimensions of the wheels of the vehicles and the dimensions of the tires, particularly the stiffness of the lower regions, entail producing the wheels in multiple parts so as to allow the tire to be mounted on a rim. It is therefore necessary to have at least three parts. In most cases, the number of parts needed is greater than three and may sometimes be as many as six parts for large-sized tires, not including the parts needed to fix the wheels to the vehicle. With the exception of the seals which are made of rubber, the parts of a wheel rim are made of metal and are therefore heavy, bulky and difficult to handle. It therefore follows that mounting and removing large and very large tires are difficult and lengthy operations. Fitting and/or removing a wheel equipped with such a tire involves laying up the vehicle or the equipment for a length of time that is rather considerable and therefore prejudicial to the desired productivity in the use of these vehicles.

Patent Application WO 00/71365 describes a technique that allows the mounting of tires to be simplified, these tires being mounted directly on the hub which then acts as a rim. Independent mounting rings act as the bead seats and are held in place by lock rings which can be secured to the hub using, in particular, complementary profiles. With this technique, the locking ring is made up of a vulcanized rubber compound reinforced by and coated onto a reinforcing ring that is circumferentially elastic and radially resistant to compression.

A technique such as this is very advantageous because it makes it possible to eliminate the phases of mounting onto a rim and of fixing a wheel to the vehicle, the tires being mounted directly onto the hub via the mounting rings and locking rings. Furthermore, since the number of elements is greatly reduced, the phases involved in handling these elements become simpler.

Tests conducted on this type of technique have revealed the fact that the locking ring, which, aside from its function of locking the system, is an element involved in the transmission of braking or driving torque, undergoes loading which causes it to wear. The locking ring which, at its surface, exhibits a rubber compound in order to give it elasticity and provide control over the coefficients of friction, particularly between the hub of the vehicle and the locking ring, therefore in use is subjected to wearing of its outer part which comes into contact with the hub on the one hand, and a mounting ring on the other hand, both of these being made of metal. This wear results in the need to change the locking ring each time the tire is changed. The complex nature of this element which is made up of a rubber compound coating an annular reinforcing element that is resistant to compression and the need to change it periodically leads to additional costs that must be borne by the user.

SUMMARY OF THE INVENTION

One object of the invention is to improve the technique disclosed in document WO 00/71365 and, in particular, of limiting the costs associated with operating and maintaining this technique.

This objective has been achieved according to an embodiment of the invention using a locking ring for a ring for mounting on a hub of a vehicle, the mounting ring being intended to receive a bead of a tire in an assembly for mounting the tire on the hub of a vehicle, the locking ring comprising a polymeric envelope and an incompressible reinforcing element, the two elements being separable.

A reinforcing ring that is said to be incompressible or radially resistant to compression must be understood to mean a ring in which the maximum radial dimension of its transverse section, that is to say the longest radial distance between two points on the contour of the section and situated on a normal to the axis of rotation of the rim, is reduced under load by 2% at most.

A polymeric envelope must be understood to mean an envelope consisting essentially and, in particular, for the most part, of at least one polymer compound.

The polymer compound is advantageously a compound containing vulcanized rubber, that is to say a blend of elastomer(s), reinforcing fillers and additives, all of which are well known, that is then vulcanized at a certain temperature.

The polymeric envelope advantageously has a secant elastic modulus of at least 1 MPa under $1a$ relative elongation of 10%.

The locking ring is advantageously circumferentially elastic. A ring that is said to be circumferentially elastic must be understood to mean a ring in which the circumferential development is capable of lengthening by at least 3% under a load of 50 daN at most, and of returning to its initial state when the load is removed. The locking ring thus allows simplified handling for fitting it in the mounting assembly, while at the same time gripping the hub of the vehicle.

The circumferential direction, or longitudinal direction, of the tire is the direction corresponding to the periphery of the tire and defined by the direction in which the tire runs.

The transverse or axial direction of the tire is parallel to the axis of rotation of the tire.

The radial direction is a direction intersecting the axis of rotation of the tire and perpendicular thereto.

The axis of rotation of the tire is the axis about which it rotates under normal use.

A radial or meridian plane is a plane containing the axis of rotation of the tire.

The circumferential meridian plane or equatorial plane is a plane perpendicular to the axis of rotation of the tire and which splits the tire into two halves.

The locking ring thus produced according to the invention in particular makes it possible, when changing a tire, to change the polymeric envelopes of the locking rings associated with it, as these could be damaged, but to keep the incompressible reinforcing rings. These incompressible reinforcing rings could, a priori, be used throughout the life of the vehicle.

According to a preferred embodiment of the invention, the polymeric envelope has an opening. The opening of the polymeric envelope is advantageously designed for the insertion of the incompressible reinforcing element either before the locking ring is fitted in the mounting assembly or at the same time as the locking ring is being fitted.

As a further preference, the polymeric envelope is open around its entire periphery and has ends running circumferentially. An opening such as this, which corresponds to a circumferential slot, allows the incompressible reinforcing element, which may itself then already be in the form of a closed ring, to be introduced.

Each circumferential end of the polymeric envelope then advantageously has an elastic circumferential reinforcing element. The reinforcing element that is radially innermost when the locking ring is in place in the assembly for mounting on a hub has the essential function of holding the locking ring in place and retaining it on the hub. The reinforcing element that is radially outermost when the locking ring is in place in the mounting assembly has the essential function of holding the incompressible reinforcing element in the polymeric envelope. This radially outermost reinforcing element advantageously has very great elasticity to make it easier to introduce the incompressible reinforcing element into the envelope.

According to one advantageous embodiment of the invention, the incompressible reinforcing element consists of a collection of several, preferably identical, individual elements joined together to form a reinforcing ring. An embodiment such as this in particular allows for simplified handling and simplified transportation of the incompressible reinforcing element since the individual elements can be handled independently of one another.

Advantageously too, each individual element is such that it corresponds to a sector representing between 5 and 60° of the reinforcing ring when the latter is in place in the assembly for mounting the tire on the hub of the vehicle. The locking ring, when fitted in the assembly for mounting a tire on a hub, fits partially into a recess made on the hub. This recess has an axially outer part which exhibits a slope which in particular allows the transmission of torque. The position of the incompressible reinforcing element can vary slightly in the axial direction along the slope of the recess while the tire is being mounted. An individual element representing a sector of between 5 and 60° can be produced with a longitudinal curvature such that the individual element does not damage the polymeric envelope regardless of its position along the slope of the recess, and therefore regardless of the radius at which it lies. Elements of longer length with a given curvature may, in certain positions, bear against the polymeric envelope via their ends and therefore run the risk of damaging this envelope on account of high localized pressure. When the individual elements are made of metal, each individual element advantageously represents a sector of between 5 and 30°.

One preferred embodiment of the invention makes provision for the individual elements to be joined together by additional elements comprising elongating means associated with an elastic restoring force. An embodiment such as this allows the incompressible reinforcing element to be given some elasticity and thus allows the pressure to be distributed uniformly around the entire periphery of the element.

A locking ring according to an embodiment of the invention is considered to have at least two walls: a radially inner wall and a radially outer wall, the said two walls possibly being connected by lateral walls that are practically perpendicular to the direction of the axis of rotation. The radially inner wall has a shape similar to the shape or profile of the recesses or grooves created on the hub of the piece of equipment in order to receive the said rings. The said recesses may, when viewed in meridian section, have any shape but preferably have a meridian section the surface of which is almost triangular with a base along the generator of the hub and with two sides making acute angles ranging between 10° and 45° with the direction parallel to the axis of rotation, the two sides being connected, at their opposite ends to the said base, by a rounded vertex, so as to minimize stress concentrations and the risk of fatigue cracking. The quasi-height of the said triangle, shortened by the rounded vertex on the said base, preferably ranges between 10 and 45 mm. The radially inner wall of the locking ring in meridian section has a profile identical to the interior profile of the quasi-triangle described hereinabove.

The meridian section of the reinforcing ring of the locking ring, in its radially inner part, may be of any shape in as much as a substantial part of the maximum radial dimension of its meridian section lies inside the triangular section of the recess formed in the hub. The expression "substantial part" must be understood to mean a radial distance representing at least 25% of the maximum radial dimension of the section of the reinforcing ring.

According to an alternative form of embodiment of the invention, the meridian section of the reinforcing ring is, in its radially inner part, polygonal with at least two sides substantially parallel to the two sides of the triangular section of a recess made on the hub of the vehicle, and at least 25% of the maximum radial dimension of the meridian section of the ring lies within the triangular section of the recess formed in the hub.

Advantageously, the meridian section of the reinforcing ring is, in its radially outer part, polygonal with at least one tapered part the generator of which makes an angle that may range between 15° and 45° with respect to the direction of the axis of rotation. The tapered part will then, when the tire is being mounted, come to face the tapered part of the radially inner wall of the mounting ring on which the bead of the tire will be mounted.

In order to make the operations of removing the tire and of removing the locking ring easier, the incompressible reinforcing element is advantageously equipped with and/or associated with a cord or strap, for example a metal one, allowing the ring to be dislodged from the recess in the hub by pulling on the cord.

The mounting ring is an element, for example made of metal, made up of a rim seat, generally tapered but which could be cylindrical, or some other shape, the seat being extended axially and radially outwards by a rim flange, it being possible for the flange optionally to be independent of the seat and removable from the seat. The mounting ring advantageously has a radially inner wall formed of at least one tapered part the generator of which makes an angle ranging between 15° and 45° with the direction of the axis of rotation, while the radially outer wall, when viewed in meridian section, is made up, on the one hand, of a tapered generator forming an angle that may range between 0° and 16° with the direction of the axis of rotation and, on the other hand, extending the generator axially outwards via an arc of a circle, of the curve that represents the axially inner and radially outer profile of the rim flange. In all cases, the curve is advantageously situated radially on the outside and axially on the inside of a segment of straight line joining the point of intersection of the curve with the tapered generator mentioned hereinabove and that point on the curve that is furthest from the axis of rotation. Thus, the curve may be formed of an arc of a circle tangential to the arc of a circle connecting the tapered generator with the curve. It may also be formed of a segment of a straight line which may or may not be perpendicular to the axis of rotation, tangential radially on the inside to the above connecting arc and radially on the outside to a second arc of a circle so as to obtain the desired curve. The mounting rings may be independent of the tire and, more specifically, of the beads of the tire. To facilitate and speed up mounting and removal operations, and the various handling operations required, the mounting rings with seats and flanges form an integral part of the tire just as, for example, do the bead wires; the rings may be secured to the beads of the tire by press-fitting without the possibility of detachment. A principle such as this is described in the applicant company's Patent FR 2 087 770.

Whether or not they are secured to the beads of the tire, and with a view to allowing the elements that have to be fitted to be handled more easily, the mounting rings are advantageously equipped in their axially inner parts with a lifting system, for example of the type involving an airbag, which makes it possible to create and maintain, during fitting operations, a circumferentially constant gap between the hub and the radially inner part of the rings, hence greatly improving the latitude for axial movement. The 5 to 20 mm gap also has the purpose of allowing the tire/mounting ring assembly to be engaged by sight on the hub without binding. Another alternative form of embodiment of the invention for facilitating the fitting of the mounting rings, and of the locking rings and/or the tires, anticipates variations in diameter of the hub. With this alternative form of embodiment, the radial distance between the hub and the radially inner part of the rings and/or the beads of the tire is increased in those axial regions where contact is not required, that is to say in those regions where there are no recesses for receiving the locking rings.

BRIEF DESCRIPTION OF THE DRAWINGS

Other details and advantageous features of the invention will become apparent hereinafter from the description of an exemplary embodiment of the invention given with reference to FIGS. 1 to 4 which depict.

DETAILED DESCRIPTION OF THE DRAWINGS

For easy understanding, the figures are not drawn to scale.

Figure 1:
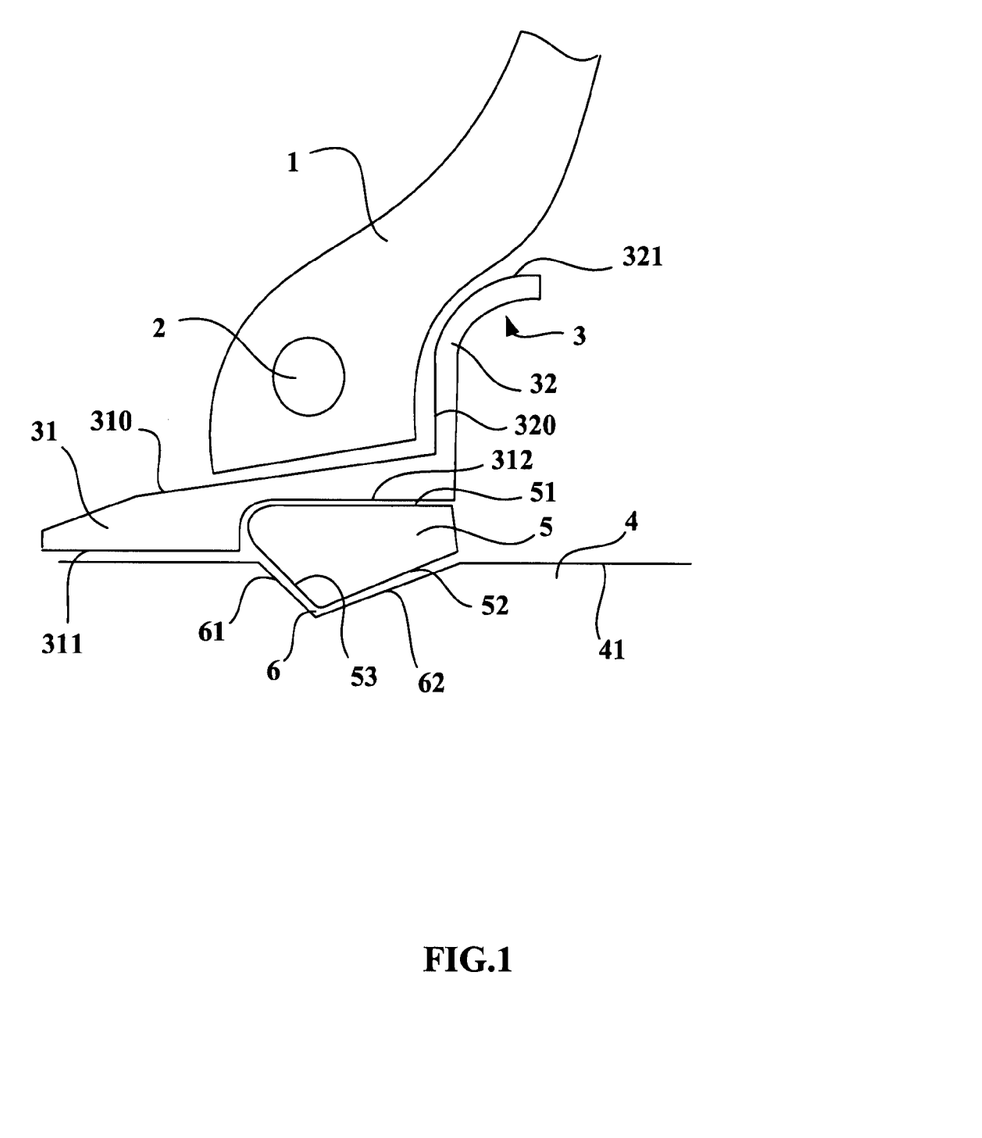
FIG. 1: a schematic depiction in meridian section of an assembly for mounting a tire on a hub according to the invention.

FIG. 1 shows only the bead 1 of a large tire intended to be fitted to a piece of construction equipment. The bead 1 is mainly reinforced by a bead wire 2 around which the radial carcass, not depicted in FIG. 1, of the tire is wound to anchor it. The bead 1 has radially inner and axially outer walls of shapes and sizes designed to be mounted on a mounting ring 3 made up of a tapered seat 31 of which the generator 310, viewed in meridian section, makes an angle of about 5° with the direction of the axis of rotation, this generator being extended axially outward by a wall 320 of a rim flange 32, the wall 320 being perpendicular to the direction of the axis of rotation and ending axially and radially on the outside in a rounded portion 321. As for the radially inner wall of the tapered mounting ring 3, it is formed of an essentially cylindrical first part 311 intended to sit on the cylindrical surface of a hub 4 and of a second part 312 intended to come into contact with the radially outer wall 51 of the locking ring 5, the wall 51 being of a shape that complements that of the wall 312. The locking ring 5 thus has a radially outer surface 51 intended to be in contact with the radially inner surface 312 of the mounting ring 3 and a radially inner surface formed of two generatrices 52, 53 which is inserted in a recess 6 of the hub 4, the shape of the recess 6 complementing the surface formed by the two generatrices 52, 53 of the locking ring 5. Upon assembly, the two generatrices 52, 53 come into contact with and bear against the two tapered generatrices 61, 62 of the recess 6 created in the hub 4. The generatrices 61, 62 of the recess 6, with the continuation of the cylindrical generator 41 of the hub 4, form a triangle with two sides 61, 62 and a base of sufficient axial width that at least one third of the locking ring 5 lies inside the triangle defined above, thus, in conjunction with the shape of the recess 6 and the radially inner and outer shapes of the locking ring 5, providing enough axial retention to retain the ring 5 under all running conditions.

Figure 2:
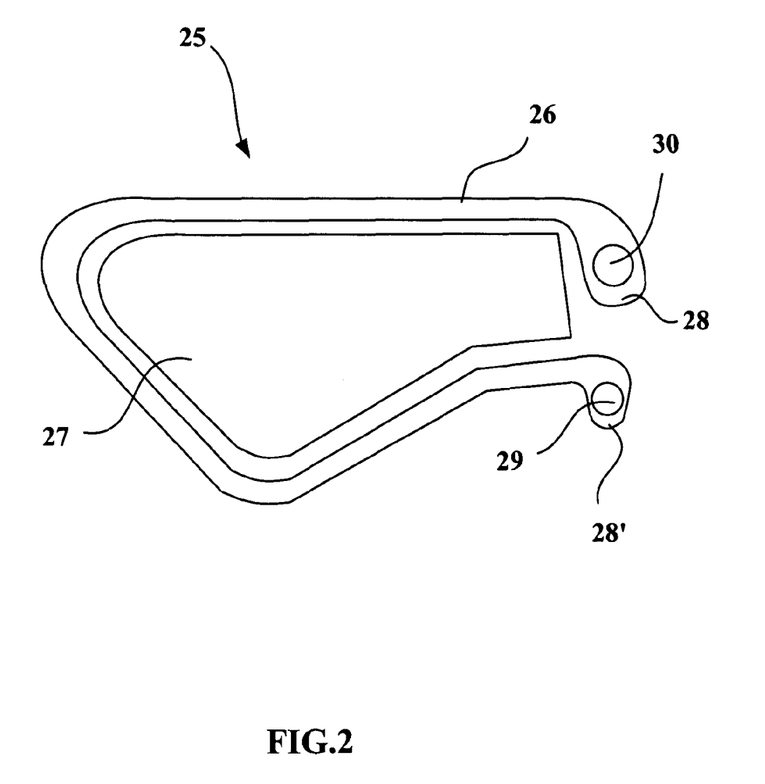
FIG. 2: a schematic depiction in meridian section of the locking ring according to the invention.
Figure 3:
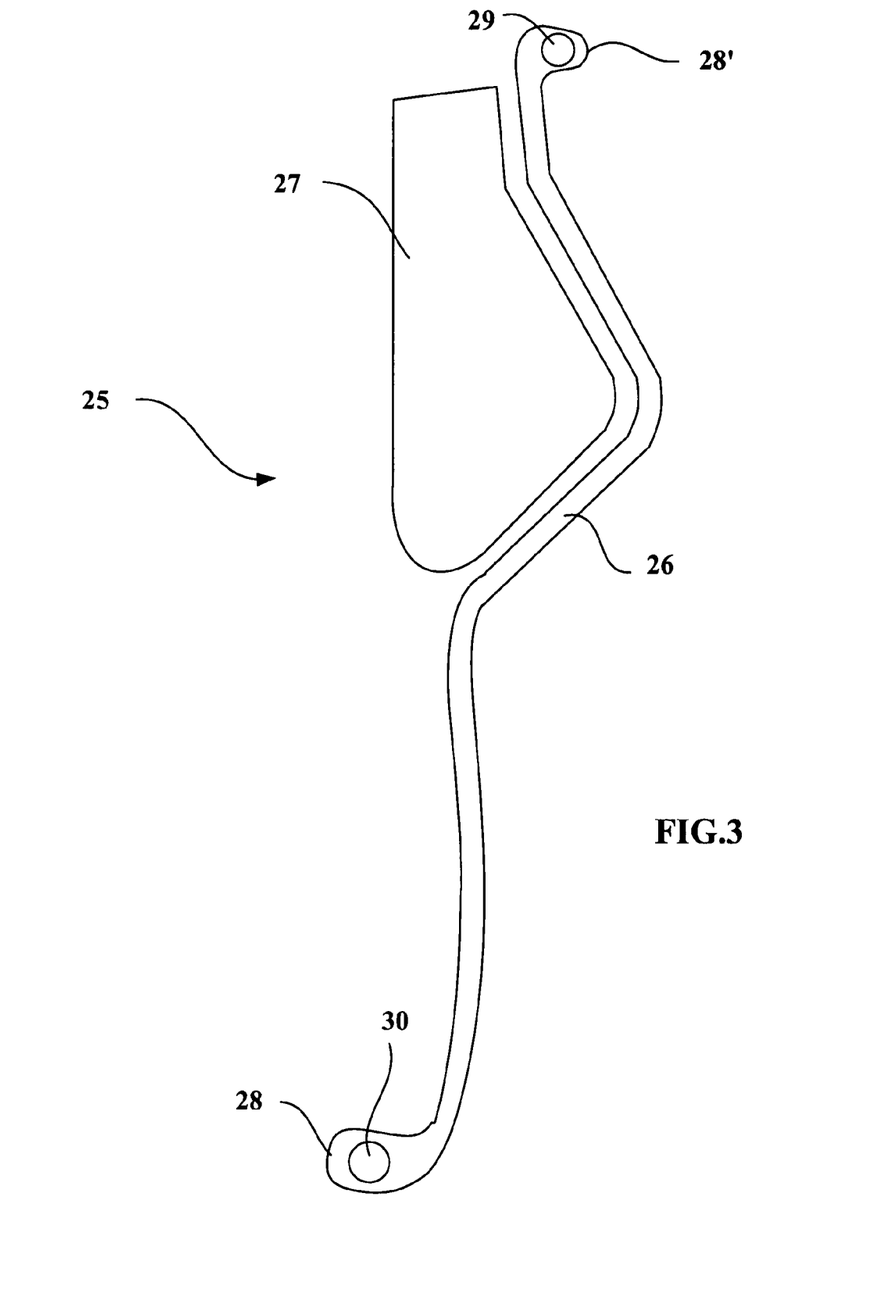
FIG. 3: a schematic depiction in meridian section of the locking ring of FIG. 2, in a position that allows the metal reinforcing element to be introduced.

FIGS. 2 and 3 depict a locking ring 25 consisting of a polymeric envelope 26 and of an incompressible reinforcing element 27. The polymeric envelope 26, of annular shape, is open over its entire periphery and thus forms two circular or circumferential ends 28, 28'. Each circumferential end 28, 28' of the polymeric envelope has an elastic circumferential reinforcing element 29, 30. The reinforcing element 29, that is radially innermost when the locking ring is in place in the assembly for mounting on a hub, has the essential function of fitting and holding the locking ring on the hub. In the scenario depicted in FIGS. 2 and 3, the circular end 28' of the polymeric envelope 26 has a shape such that it advantageously fits into a complementary recessed shape, not depicted in the figures, provided on the hub of the vehicle at the time of assembly. The reinforcing element 29 is then at least partially inserted into the complementary recessed shape in order to carry out to the full its function of holding the locking ring on the hub. The reinforcing element 30 that is radially outermost when the locking ring is in place in the mounting assembly has the essential function of holding the incompressible reinforcing element 27 in the polymeric envelope 26. This reinforcing element 30 has very great elasticity to facilitate the introduction of the incompressible reinforcing element 27 into the envelope 26. This is illustrated in particular in FIG. 3 in which it is clear that the great elasticity of the reinforcing element 30 allows the envelope 26 to be opened up in such a way as to allow the incompressible reinforcing element 27 to be inserted. In this FIG. 3, the permitted opening of the envelope 26 is practically total and thus allows the incompressible reinforcing element 27 to be fitted while the envelope 26 is already in place in the recess provided for that purpose on a hub of a vehicle. Assembling the locking ring can thus be simplified.

The locking ring 5, 25 thus formed according to the invention has two opposite walls: a radially inner wall and a radially outer wall, the two walls being connected by lateral walls practically perpendicular to the direction of the axis of rotation. The radially inner wall has a shape similar to the shape or profile of the recesses 6 of the hub 4 of the vehicle so as to receive the rings 5, 25. As described before, a recess 6 has a meridian section the surface of which is almost triangular with one base along the generator of the hub and two sides forming acute angles ranging between 10° and 45° with the direction parallel to the axis of rotation. The radially inner wall of the locking ring 5, 25, in meridian section, has a profile identical to the interior profile of the quasi-triangle described hereinabove, as shown by FIG. 1.

The meridian section of the reinforcing ring 27 is similar to that of the locking ring 5, 25 and therefore likewise, in meridian section, has a profile identical to the interior profile of the quasi-triangle that the recess 6 of the hub forms.

The meridian sections of the reinforcing ring 27 and of the locking ring 5, 25 have, in their radially outer parts, a tapered part the generator 51 of which complements the radially inner wall 312 of the mounting ring on which the bead 1 of the tire is mounted.

Figure 4:
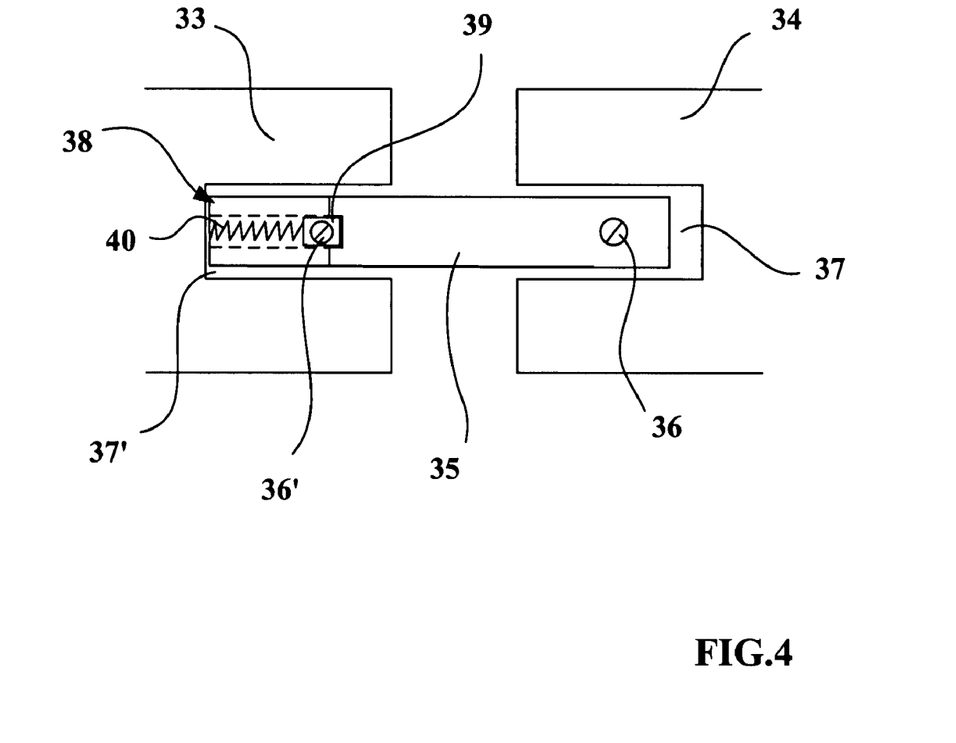
FIG. 4: a schematic depiction in circumferential section of part of the metal reinforcing element of the locking ring according to one embodiment of the invention.

FIG. 4 depicts part of an incompressible reinforcing element of the locking ring and, more specifically, two of the elements 33, 34 of which it is formed, the elements being connected by a connecting element 35.

The incompressible reinforcing element thus advantageously consists of a collection of several, preferably identical, individual elements 33, 34 joined together to form a reinforcing ring. This embodiment in particular allows for simplified handling and simplified transportation of the incompressible reinforcing element. The individual elements 33, 34 may be combined on site when the tire is being mounted on a vehicle. Handling and transporting the locking ring is thereby simplified.

Each individual element 33, 34 corresponds to a sector representing between 5 and 60° of the reinforcing ring when the latter is in place in the assembly for mounting the tire on the hub of the vehicle. This small size of the individual elements 33, 34 will make it possible, when fitting the tire on a hub, to avoid any risk of damaging the polymeric envelope 26 of the locking ring 5, 25. This is because the locking ring 5, 25 which fits partially into a recess 6 on the hub has, particularly when the tire is being fitted, to move over the axially outer part of the recess 6, which has a slope. The position of the incompressible reinforcing element 27 thus varies axially along the slope of the recess while the tire is being mounted and therefore has a changing radial position. An individual element corresponding to a sector representing between 5 and 60° is produced with a longitudinal curvature such that the individual element does not damage the polymeric envelope irrespective of its position along the slope of the recess, and therefore of the radius of curvature at which it lies. When an individual element is made of metal, since the flexibility of metal is low, it advantageously corresponds to a sector representing less than 30°. The length of the individual element, that is to say the length of the sector to which it corresponds, will be defined according to the nature of the material used. Whatever the nature of the material of which the individual elements are made, these elements may also have axially-oriented and narrow cuts to make the individual elements more flexible in the radial direction and thus minimize any risk of damaging the polymeric envelope.

The connecting element 35 which connects the individual elements 33, 34 together has means of elongation associated with an elastic restoring force. In FIG. 4, the element 35 is thus produced in the form of a component, preferably a metal component, fixed, at the points 36, 36', to each of the elements 33, 34, one on each side. Attachment is by any means known to those skilled in the art. Advantageously, the element 35 penetrates depressions 37, 37' in each of the elements 33, 34 and provided for this purpose at their ends. The element 35 further comprises an elongation system 38 with an elastic restoring force. This system 38 is, for example, as depicted in FIG. 4, produced using a moving part 39 that can move in the circumferential direction, the moving part being associated with the attachment point 36'. The movement of this part 39 makes it possible to lengthen the distance between the two elements 33, 34 and thus corresponds to a circumferential lengthening of the annular reinforcing element 27. As it moves, the moving part 39 compresses a spring 40 which creates a restoring force and therefore gives the abovementioned circumferential elongation of the annular reinforcing element 27 an elastic nature.

Figure 5:
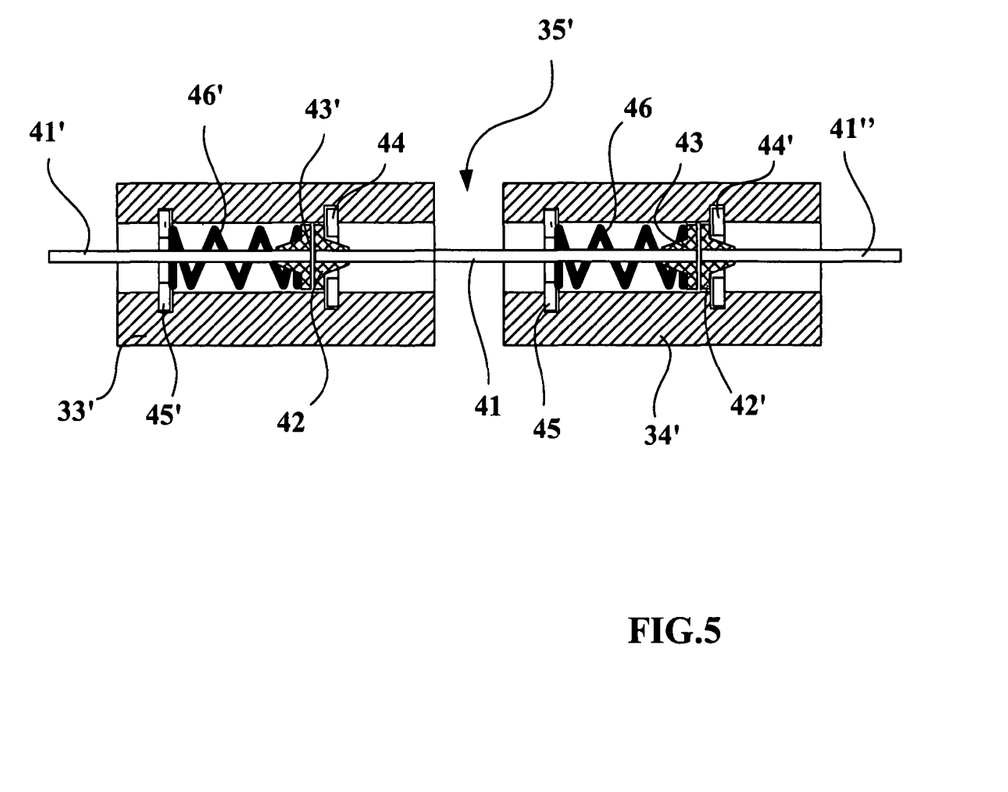
FIG. 5: a schematic depiction in circumferential section of an alternative form of embodiment of an element used to connect two individual elements.
Figure 6:
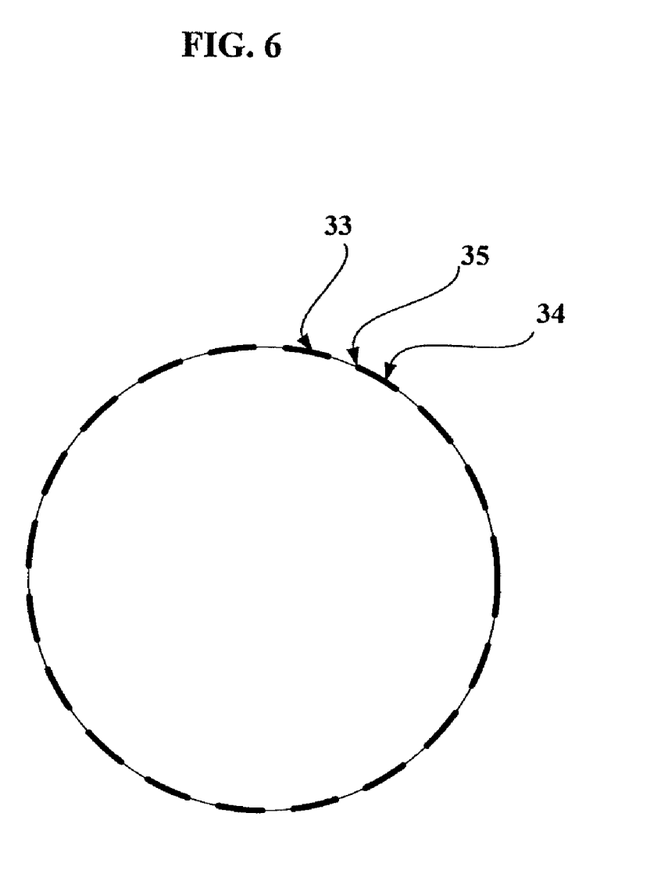
FIG. 6: a schematic depiction of several individual elements joined together to form a reinforcing ring.

FIG. 5 depicts, in circumferential section and as in the case of FIG. 4, part of an incompressible reinforcing element and, more specifically, two of the elements 33', 34' of which it is composed, the elements being connected by a connecting element 35'. The connecting element 35' comprises means of elongation associated with an elastic restoring force; it in particular consists of a cable 41, 41', 41", preferably a metal cable, of cable fixing elements 42, 43, 42', 43' and of blocking means 44, 45, 44', 45' for blocking the fixing elements in the individual elements 33', 34'. A spring 46, 46' is advantageously interposed between the fixing element 43, 43' and the blocking means 45, 45' in order to provide a restoring force in the event that the incompressible reinforcing ring is circumferentially extended. The cable fixing elements 42, 43, 42', 43' are, for example, crimped onto the cables. The blocking means 44, 45, 44', 45' are any element known to those skilled in the art and are advantageously introduced from the outside of the individual elements 33', 34'; they have a shape such that they can retain the cable fixing elements 42, 43, 42', 43' while at the same time not impeding the passage of the cable 41, 41', 41". The individual elements 33', 34' have a duct passing through them in the circumferential direction, this duct for example being of circular cross section and having the same diameter as the fixing elements 43, 43', as depicted in FIG. 5.

Whatever the way in which the connecting element 35, 35' is embodied, such as the ways depicted by way of example in FIGS. 4 and 5, the same type of fixing element can be used for joining together all the individual elements that make up the incompressible reinforcing element of the locking ring. However, according to certain alternative forms of embodiment, the invention anticipates the final connection, that is to say the final assembly between two individual elements that forms the assembly into a continuous annular element, to be achieved using a simplified connecting element that possibly does not have any means of elongation associated with an elastic restoring force; this may, for example, involve a mechanical component of the bracket type which is inserted in slots made for that purpose on each end of the last two individual elements to be joined in order to form the incompressible annular reinforcing element.

The polymeric envelope 26 is also produced in such a way as to have elastic elongation properties compatible with those of the reinforcing ring 27.

The small size of the individual elements 33, 34, the fact that they are all advantageously chosen to be identical and that they are connected by connecting elements 35, 35' which are also all identical and, in particular, exhibit identical restoring forces, make it possible to obtain a uniform distribution of the pressure on the hub and therefore on the one hand optimize the mounting of the tire on the hub and, on the other hand, optimize the operation of the tire, particularly where the transmission of torque is concerned.

The invention as has just been described in particular with reference to the exemplary embodiments must not be interpreted as being restricted to these exemplary embodiments. The various elements that make up the assembly for mounting the tire may be embodied in different ways while still falling within the scope of the invention.

The hub may, for example, have a region of a diameter greater than its mean diameter, for example to leave space for a braking device. This larger-diameter region may advantageously be provided under the region where the axially inner bead of a tire is fitted. The mounting rings and possibly the locking rings which are intended to be associated with each of the beads of a tire may then have different meridian sections; it must then be understood that the region that forms the place where the beads of the tire are housed preferably remains similar for both mounting rings so that the tire remains of conventional and, in particular, symmetric, design.

The locking ring may, for example, have circumferential protrusions such as striations on its radially outer and radially upper surfaces. Such striations which, on the one hand, come into contact with the hub and, on the other hand, come into contact with the mounting ring may contribute to providing what is known as the "primary" seal in order to begin to inflate the assembled entity thus formed. Similarly, such protrusions may be present in that region of the hub that is intended to come into contact with the locking ring and/or on the radially inner surface of the mounting ring.

The invention claimed is:

1. A locking ring for a ring for mounting on a hub of a vehicle, the mounting ring being adapted to receive a bead of a tire in an assembly for mounting the tire on the hub of a vehicle, wherein the locking ring comprises a polymeric envelope and an incompressible reinforcing element, and wherein the polymeric envelope and the incompressible reinforcing element are separable;

wherein the incompressible reinforcing element comprises a collection of several, individual elements joined together to form a reinforcing ring; and wherein each of the individual elements corresponds to a sector representing between 5 and 60° of the reinforcing ring when the latter is in place in the assembly for mounting the tire on the hub of the vehicle.

2. The locking ring according to claim 1, wherein the polymeric envelope has an opening.

3. The locking ring according to claim 2, wherein the polymeric envelope is open around its entire periphery and has ends running circumferentially.

4. The locking ring according to claim 3, wherein at least one circumferential end of the polymeric envelope has an elastic circumferential reinforcing element.

5. The locking ring according to claim 1, wherein the polymeric envelope has a secant elastic modulus of at least 1 MPa under a relative elongation of 10%.

6. The locking ring according to claim 1, wherein the individual elements are joined together by additional elements applying an elastic restoring force to the individual elements.

7. The locking ring according to claim 1, wherein a meridian section of the reinforcing ring is, in a radially inner part, polygonal with at least two sides substantially parallel to two sides of a triangular section of a recess made on the hub of the vehicle, and at least 25% of a maximum radial dimension of the meridian section of the reinforcing ring lies within the triangular section of the said recess formed in the hub.

8. The locking ring according to claim 7, wherein the meridian section of the reinforcing ring is, in a radially outer part, polygonal with at least one tapered part, and the tapered part comprises a generator forming an angle ranging between 15° and 45° with respect to an axis of rotation.

9. The locking ring according to claim 1, wherein the incompressible reinforcing element comprises a collection of several identical individual elements joined together to form a reinforcing ring.

* * * * *